United States Patent [19]

Clark, Jr.

[11] 4,087,880

[45] May 9, 1978

[54] BROOM

[75] Inventor: Franklin T. Clark, Jr., Girard, Pa.

[73] Assignee: Tantera, Inc., Girard, Pa.

[21] Appl. No.: 644,073

[22] Filed: Dec. 24, 1975

[51] Int. Cl.² .............................................. A46B 3/04
[52] U.S. Cl. ...................................... 15/175; 15/193; 300/21; 264/243
[58] Field of Search ............. 15/159, 159 A, 171–178, 15/191–193; 300/21; 264/243

[56] References Cited

U.S. PATENT DOCUMENTS

| 876,884 | 1/1908 | Kenny | 15/175 |
|---|---|---|---|
| 2,202,292 | 5/1940 | Howard | 15/193 X |
| 2,870,473 | 1/1959 | Schwartz | 15/175 X |
| 3,533,123 | 10/1970 | Brunello | 15/175 X |

FOREIGN PATENT DOCUMENTS

| 1,495,616 | 8/1967 | France | 15/171 |
|---|---|---|---|
| 556,388 | 2/1957 | Italy | 15/171 |

*Primary Examiner*—Peter Feldman
*Attorney, Agent, or Firm*—Charles L. Lovercheck

[57] ABSTRACT

A broom having an integrally molded plastic base member comprising a rectangular flange portion including a downwardly-directed circumferential flange portion extending around said elongated flange portion to provide a bristle-receiving opening therein. A plurality of bristles, arranged in a tightly held bundle, are bonded to said base within said opening by the intrusion of said plastic material between the ends of the bristles. A cover member is secured to the boss of the base by a snap-fit arrangement and the skirt of the cover engages the outer edges of the circumferential flange portion.

2 Claims, 7 Drawing Figures

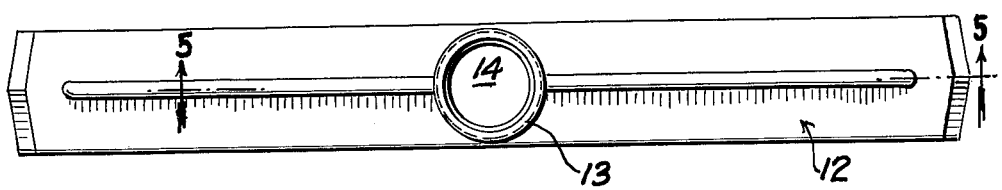
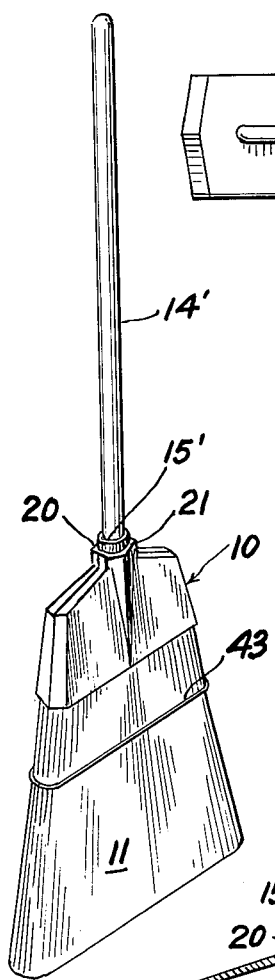
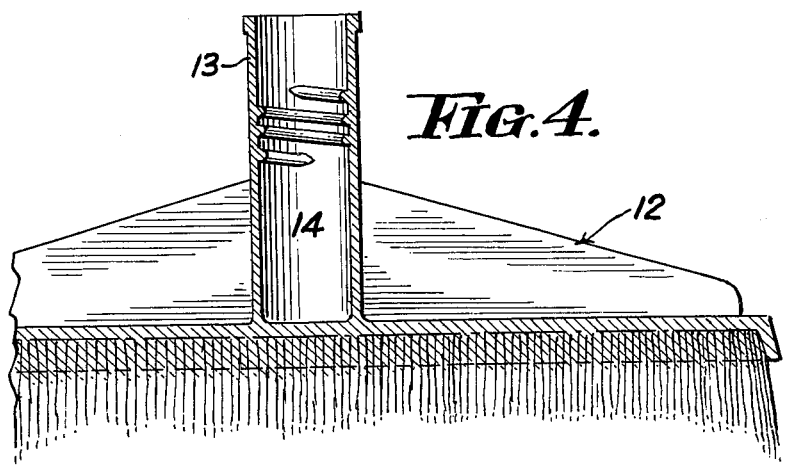
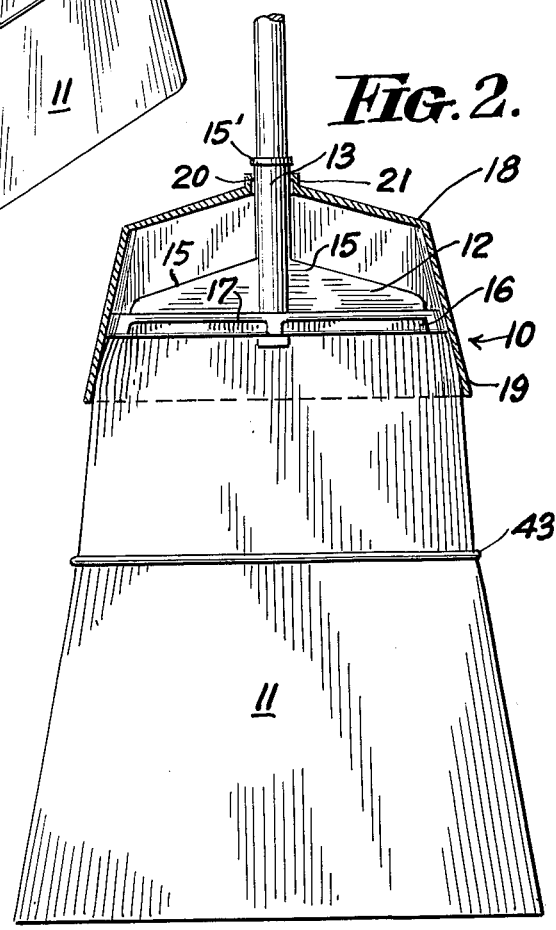
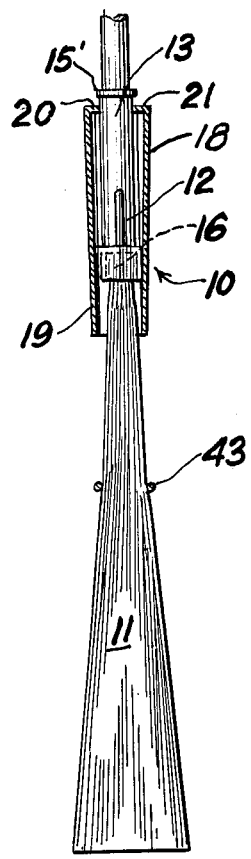

BROOM

OBJECTS OF THE INVENTION

It is an object of the invention to provide an improved broom.

Another object of the invention is to provide a broom that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 1 is an isometric view of the broom and cover with a broomstick attached thereto according to the invention.

FIG. 2 is a longitudinal, view of the cover and broom with the cover shown in cross-section.

FIG. 3 is a view taken at right angles to the view in FIG. 2.

FIG. 4 is an enlarged, lateral, cross-sectional view of the base of the broom with the cover shown in cross-section.

FIG. 5 is a top view of the base and broom with the cover removed.

DETAILED DESCRIPTION OF DRAWINGS

Figure 6:
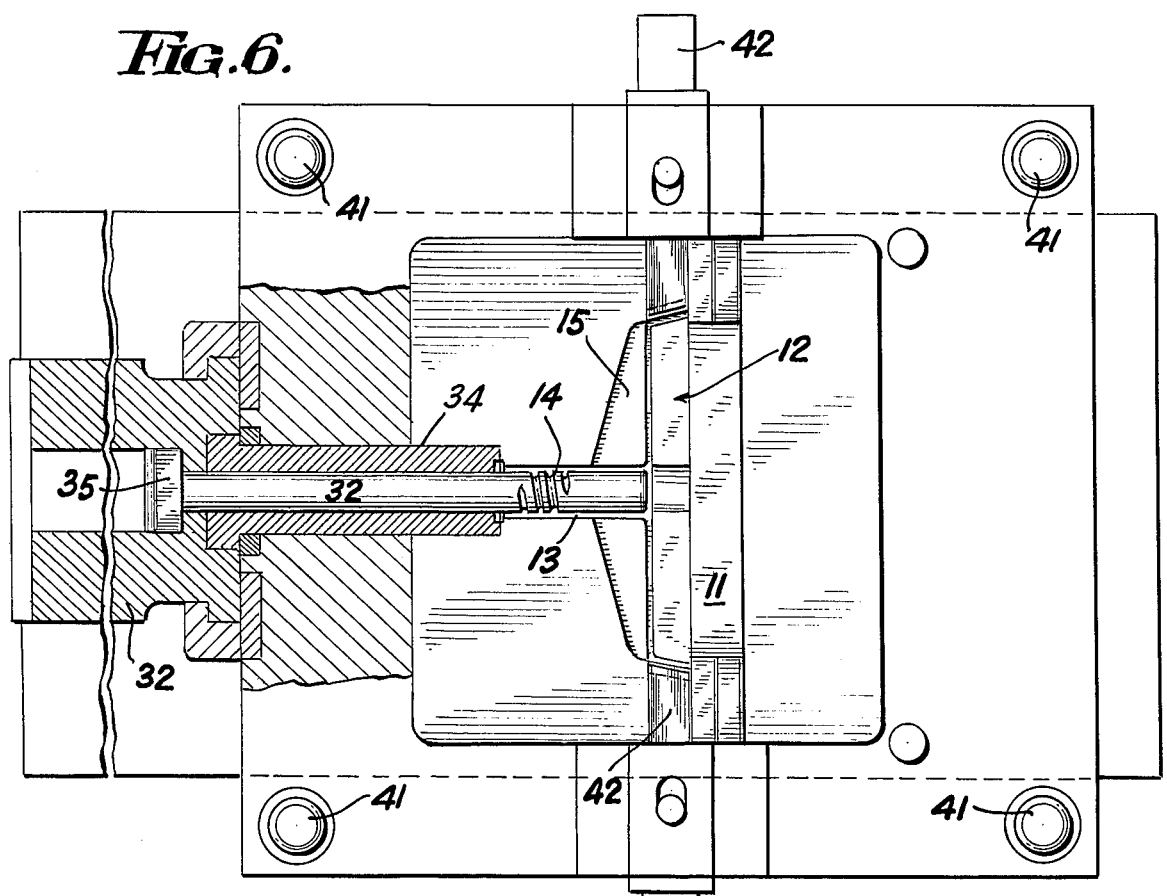
FIG. 6 is a longitudinal, cross-sectional view of the bottom half of the mold.

Now, with more particular reference to the drawing, the broom is shown generally at 10. The broom has bristles 11, base 12 and a cover 18 for the base. A handle 14 is shown threadably received in the hollow boss 13. Bristles 11 are held by wire 43.

These may be molded of an integral moldable thermoplastic material such as vinyl chloride, polyethylene or the like.

The base 12 receives the ends of the bristles 11 and the cover 18 fits over the boss 13 and has a rim 20 that snaps under the outwardly-directed flange 15'.

The base 12 is made up of plate-like webs 15, 15 integrally fixed to the boss 13 and extending perpendicular thereto. The hollow boss 13 is formed integrally with the webs 15, 15 and the flange 17.

The boss 13 is integrally attached to the laterally-extending web 15 which likewise is integral with the flange 17, web 15 extends laterally perpendicular to the boss 13 and perpendicular to the flange 17, the flange 16 extends in the direction of the boss 13 that overlies the bristles or straw 11.

An outwardly-directed flange 15' is formed on the outside of the boss 13 adjacent its distal end.

The cover 18, being U-shaped in cross-section, has a closed end and a skirt 19 which overlies the base 12 and engages the outer edges of the flange 16. The cover 18 has a boss 20 which in turn has an inwardly-directed rim that snaps over the flange 15' on the boss 13 when the cover is put in place on the broom thereby holding the cover in place.

The material of the cover and base are both such that the inwardly-directed flange 21 will snap over the outwardly directed flange 15' on the boss 13.

Figure 7:
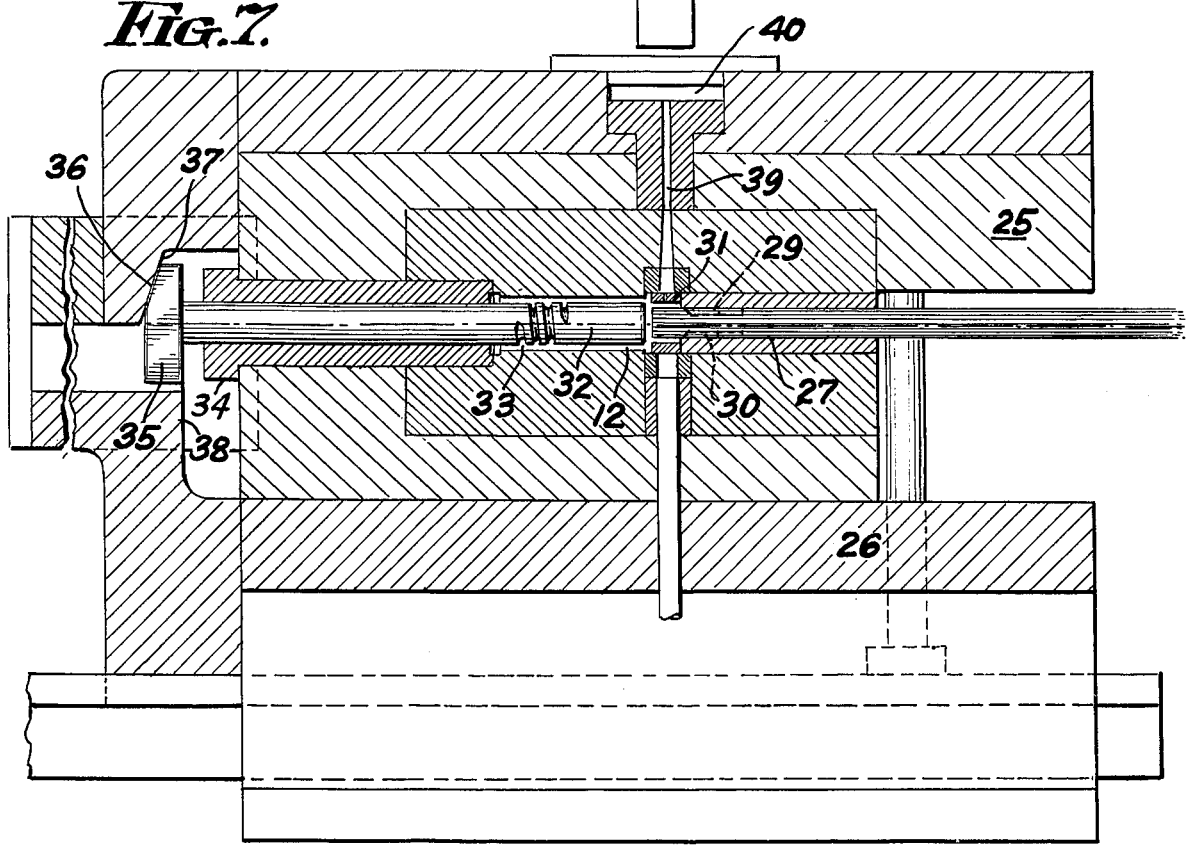
FIG. 7 is a longitudinal, cross-sectional view of the mold.

The mold shown in FIGS. 6 and 7 is made up of an upper part 25 and a lower part 26. The cavity in the mold is open at 27 to receive the broom straws or bristles 11, and the mold clamps the straws at 29 and 30, clamping the straws to prevent the escape of plastic material so that the space at 31 is filled with plastic and the plastic material empots the ends of the straws by intrusion of the plastic material between said bristle ends.

The threaded mandrel 32 is inserted into the cavity 33 and extends through the bushing 34 and has a head 35 thereon with an inclined surface 36 which is engaged by the surface 37 on the upper half 25 of the mold. Thus, when the mold is closed, the surface 36 forces the mandrel 32 into the cavity and positively engages the surface 38 of the end of the mold with the underside of the head 35 of the mandrel, thereby positively locating it in position.

Plastic material is injected through the gate 39 into the mold cavity, and a suitable heating cylinder for preheating the plastic can be connected at 40. The mandrel 32 is threaded at 41 to form the internal threads in the boss 13.

The mold is provided with the locating pin 41 which engages locating openings in the other half of the mold.

The sliding members 42 slide in relative to the sides of the mold, exerting a pressure on the edges of the straw bristles and move outwardly to release the straw and the molded base 12 from the mold.

To carry out the process according to the invention, a suitable number of natural or synthetic fiber straws 11 are formed into the desired shape and inserted into the cavity at 11 and compressed outward of the base in two directions. The mold is then closed, compressing the straw inwardly at 29 and 30; members 42 are moved in, compressing the straw laterally; the mandrel 32 is put in place; members 42 moved in; and plastic material is injected through the gate 39. This thermo-plastic material cools in the cavities and gives the block or base the desired shape in the cavity and may or may not have the ferrule 12 for the handle fixed thereto.

In the example of the mold shown, the ferrule or boss 13 will be provided.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a broom comprising a base member integrally molded of plastic material,
    said base member having on the lower end thereof an elongated generally rectangular flange portion extending in a direction transverse to the central axis of said base,
    said elongated flange portion including a downwardly-directed circumferential flange portion extending around said elongated flange portion to provide a bristle-receiving opening therein,
    said elongated flange portion having an internally-threaded broomstick receiving hollow boss integrally formed on the upper surface thereof and perpendicular thereto, two plate-like web members, each web member extending laterally outwardly from each side portion of said hollow boss and terminating adjacent the outer ends of said elongated flange portion, each of said web members being integrally formed to said boss and to said elongated flange portion, a plurality of bristles arranged in a tightly held bundle and having bristle ends disposed within said bristle-receiving opening, said plastic material of said elongated flange and said circumferential flange intruding between said bristle ends to provide a bond therebetween, a cover member being substantially U-shaped in cross-section and having a depending skirt portion engaging said downwardly directed circumferentially flange portion, said cover having a hollow boss extending upwardly from the upper surface thereof for internally receiving said boss of said base member, said boss of said base member having an annular flange element at the upper end thereof, and said boss of said cover having an upwardly-directed annular flange element adpated to snap under said annular flange of said boss of said base member for holding said cover over said base and over the ends of said bristles.

2. The broom recited in claim 1 wherein said bristles are elongated members having the appearance of broom straw.

* * * * *